United States Patent [19]
Suzuki et al.

[11] Patent Number: 5,835,338
[45] Date of Patent: Nov. 10, 1998

[54] MULTILAYER CERAMIC CAPACITOR

[75] Inventors: Takashi Suzuki; Satoru Abe, both of Tokyo, Japan

[73] Assignee: TDK Corporation, Tokyo, Japan

[21] Appl. No.: 724,781

[22] Filed: Oct. 3, 1996

[30] Foreign Application Priority Data

Oct. 3, 1995 [JP] Japan ................... 7-255956

[51] Int. Cl.$^6$ ................... H01G 4/30; H01G 4/06
[52] U.S. Cl. ................... 361/301.4; 361/311; 361/313; 361/321.2
[58] Field of Search ................... 361/301.4, 301.5, 361/303, 306.3, 311, 312, 313, 320, 321.1, 321.2, 321.3, 321.5, 328; 29/25.42

[56] References Cited

U.S. PATENT DOCUMENTS

| | | | |
|---|---|---|---|
| 4,701,827 | 10/1987 | Fujikawa et al. | 361/309 |
| 5,072,329 | 12/1991 | Galvagni | 361/321.2 |

FOREIGN PATENT DOCUMENTS

| | | |
|---|---|---|
| 54-5755 | 6/1952 | Japan . |
| 60-76028 | 5/1985 | Japan . |
| 2-29710 | 8/1990 | Japan . |
| 4-188810 | 7/1992 | Japan . |
| 4-188811 | 7/1992 | Japan . |
| 4-188812 | 7/1992 | Japan . |
| 4-188813 | 7/1992 | Japan . |

*Primary Examiner*—Bot L. Ledynh
*Assistant Examiner*—Anthony Dinkins
*Attorney, Agent, or Firm*—Oblon, Spivak, McClelland, Maier & Neustadt, P.C.

[57] ABSTRACT

A multilayer ceramic capacitor comprising an interlayer, which mitigates stress of a dielectric material cause by a counter piezoelectric phenomenon, provided between capacity-forming layers. The capacity-forming layer preferably comprises seven or more internal electrode layers including a first electrode layer and a second electrode layer, the first electrode layer having two or more electrodes, the second electrode layer having one or more electrodes which all face the first electrode layer, the first and second electrode layers forming two or more capacitor units connected in series. The interlayer preferably has a thickness of from 75 to 900 $\mu$m. The interlayer preferably contains internal electrodes having a structure incapable of forming a capacity.

8 Claims, 4 Drawing Sheets

MULTILAYER CERAMIC CAPACITOR

BACKGROUND OF THE INVENTION

1. Field of the Invention

The present invention relates to a multilayer ceramic capacitor. More particularly, this invention relates to a multilayer ceramic capacitor having a multilayer structure which has both a large capacity and a high withstand voltage.

2. Discussion of the Background

Multilayer ceramic capacitors are characterized in that since a large capacity can be obtained by laminating dielectric layers forming a capacity, it is possible to provide small-size and low-cost capacitors. In general, these types of capacitors are used as large-capacity ceramic capacitors.

The dielectric materials constituting ceramic capacitors are roughly divided into two groups by nature. One group comprises low-dielectric constant dielectric materials which are used for temperature compensation, e.g., titanium oxide, and the other group comprises high-dielectric constant dielectric materials, e.g., barium titanate.

Low-dielectric constant dielectric materials have a low dielectric constant of about from 50 to 200, but exhibit an extremely small temperature dependence of electrostatic capacity. The low dielectric constants thereof may be attributable to the crystal structure of these dielectric materials, that is, since they have a tetragonal crystal system, they show low anisotropy and are less apt to form dipoles which influence dielectric constant. On the other hand, high-dielectric constant dielectric materials have an extremely high dielectric constant of about from 2,000 to 20,000. The high dielectric constants are attributable to the considerably distorted crystal structure thereof, which facilitates formation of dipoles. In the production of large-capacity multilayer ceramic capacitors, it is essential to employ such a high-dielectric constant dielectric material.

Multilayer ceramic capacitors of the high-voltage type (rated voltage; AC 100 (V) or higher, DC 500 (V) or higher) include capacitors having a structure in which internal electrodes each comprising many electrode pieces arranged on the same plane are laminated in such a manner that the electrode pieces function as equivalent circuits electrically connected in series, as described in JP-A-U-60-76028. (The term "JP-A-U" as used herein means an "unexamined published Japanese utility model application.")

However, these multilayer ceramic capacitors employing a high-dielectric constant dielectric material have a drawback that since a piezoelectric phenomenon or a counter piezoelectric phenomenon, i.e., so-called electrostriction, occurs due to crystal distortion (the piezoelectric phenomenon is a phenomenon in which a mechanical deformation is converted to a voltage, while the counter piezoelectric phenomenon is a phenomenon in which a voltage is converted to a mechanical deformation), increasing the number of laminated layers so as to attain a larger capacity results in cracking (mechanical breakdown) at a voltage lower than the dielectric breakdown voltage. Because of this, those multilayer ceramic capacitors have problems of low breakdown voltage, low withstand voltage, etc.

To mitigate such drawbacks, a multilayer ceramic capacitor composed of plurality of stacked capacitors each having a relatively small number of laminated layers has been proposed in JP-A-4-188810 and JP-A-4-188811 to cope with a large capacity and a high rated voltage. (The term "JP-A" as used herein means an "unexamined published Japanese patent application.")

The above-described multilayer ceramic capacitor, however, has a drawback that since an increased number of production steps and an increased number of parts are necessary, it is extremely difficult to attain miniaturization, weight reduction, and cost reduction.

SUMMARY OF THE INVENTION

An object of the present invention is to provide a multilayer ceramic capacitor which is small, lightweight, and inexpensive and has a large capacity, a high breakdown voltage, and a high withstand voltage (i.e., high-voltage type capacitor) and which is free from the cracking caused by a mechanical stress resulting from a counter piezoelectric phenomenon.

Other objects and effects of the present invention will be apparent from the following description.

According to the present invention, a multilayer ceramic capacitor which, even when increased in the number of stacked layers, has a high breakdown voltage and a high withstand voltage can be provided by forming an interlayer between layers which form a capacity.

The present invention relates to a multilayer ceramic capacitor comprising an interlayer, which mitigates stress of a dielectric material caused by a counter piezoelectric phenomenon, provided between capacity forming layers.

The present invention involves the following preferred embodiments:

(1) In the multilayer ceramic capacitor according to the present invention, the capacity-forming layer comprises seven or more internal electrode layers including a first electrode layer and a second electrode layer, the first electrode layer having two or more electrodes, the second electrode layer having one or more electrodes which all face the first electrode layer, the first and second electrode layers forming two or more capacitor units connected in series.

(2) The multilayer ceramic capacitor according to the present invention and the above preferred embodiment (1), the interlayer has a thickness of from 75 to 900 μm.

(3) In the multilayer ceramic capacitor according to the present invention and the above preferred embodiments (1) and (2), the interlayer contains internal electrodes having a structure incapable of forming a capacity.

DETAILED DESCRIPTION OF THE INVENTION

The interlayer used herein means an insulating layer which serves to mitigate the expansion of a dielectric material caused by a counter piezoelectric phenomenon and to thereby inhibit cracking. The interlayer is preferably made of the same dielectric material as that employed in capacity-forming layers. The internal electrodes that are in contact with the interlayer are preferably arranged so as not to form a capacity. Even if the internal electrodes are arranged so as to form a certain capacity, they are preferably disposed so as to almost completely prevent expansion by a counter piezo-electric phenomenon, by reducing the area of overlaps, increasing the distance between electrodes, etc.

The layers forming a capacity (capacity-forming layers) preferably have a structure which contain seven or more internal electrode layers, i.e., contain six or more dielectric layers, in which the first electrode layer has two or more electrodes and the second electrode layer has one or more electrodes which all face the first electrode layer, with the first and second electrode layers forming two or more capacitor units connected in series. Because of this electrode arrangement, the resulting multilayer capacitor has heightened breakdown and withstand voltages.

In a conventional multilayer ceramic capacitor having no interlayer, if the number of internal electrode layers becomes seven or more, the breakdown voltage is considerably lowered because of stress concentration due to a counter piezoelectric phenomenon of the dielectric material. The present invention can effectively solve such a problem associated with the conventional multilayer ceramic capacitor having seven or more internal electrode layer.

The thickness of the interlayer is preferably from 75 to 900 $\mu$m. If the thickness thereof is smaller than 75 $\mu$m, the stress concentration caused by the counter piezoelectric expansion of the capacity-forming layers is less apt to be mitigated. If the thickness thereof exceeds 900 $\mu$m, the multilayer structure has an increased thickness, which is contrary to the desired miniaturization.

The interlayer may contain, on the same plane, internal electrodes having a structure incapable of forming a capacity. This is because since electrostriction occurs in capacity-forming layers, i.e., in layers to which an electric field is applied, the formation of electrodes having a structure incapable of forming a capacity does not influence electrostriction.

Figure 1:
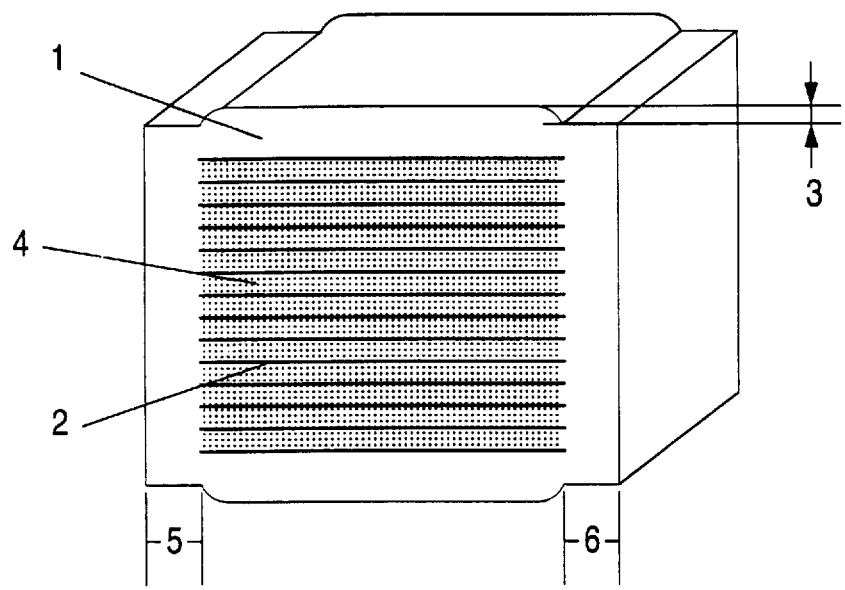
FIG. 1 shows a diagrammatic view of a multilayer ceramic capacitor which has expanded as a result of a counter piezoelectric phenomenon.

As shown in FIG. 1, in a multilayer ceramic capacitor employing dielectric layers 1 having a high dielectric constant, each of capacity-forming layers 4 expands in the vertical direction upon application of a voltage. This expansion is caused by a counter piezoelectric phenomenon as described above; the higher the applied voltage, the higher the degree of expansion. The margins 5 and 6 (the parts that do not contain internal electrodes 2) do not expand since a voltage is not applied thereto. Because of the above, the multilayer ceramic capacitor of the type shown in FIG. 1, which is used at a high applied voltage in order to cope with a high rated voltage, is apt to suffer cracking in the dielectric material and to undergo dielectric deterioration. This tendency becomes more pronounced when the laminated number of capacity-forming layers is increased to obtain a large capacity. However, by forming the interlayer, which does not expand, between the capacity-forming layers, which expands, expansion of the dielectric material can be mitigated and the stress imposed around the interfaces with the margins can be dissipated. As a result, a multilayer ceramic capacitor can be provided with which it is possible to cope with an increase in the number of stacked layers, i.e., capacity, and with a high rated voltage.

The present invention will be explained below in more detail by reference to embodiments thereof, but the present invention is not construed as being limited thereto.

EXAMPLE 1

Figure 2:
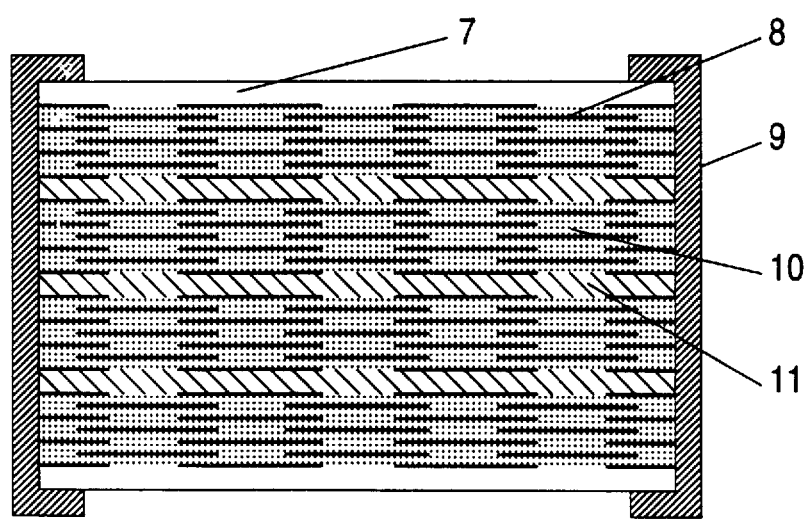
FIG. 2 shows a sectional view of a multilayer ceramic capacitor in Example 1 according to the present invention which has layers incapable of forming a capacity.

A multilayer ceramic capacitor having a sectional view shown in FIG. 2 was produced. As shown in FIG. 2, the multilayer ceramic capacitor of Example 1 had a structure produced by stacking four units of capacity-forming layers, each of which was composed of six dielectric layers 10, in such a manner that the units (capacity-forming layers) were separated by 75 $\mu$m-thick layers 11 (interlayers) made of the same material as the dielectric layers 10, forming insulating layers 7 as the outermost layers, and further forming outer electrodes 9 connected to internal electrodes 8.

In this capacitor, the internal electrodes in each capacity-forming layer have been divided on the same plane and capacity-forming parts had been arranged in series, as described hereinabove, thereby making the structure suitable for a high withstand voltage.

The capacitor described above was produced by the following procedure.

A ceramic dielectric material powder consisting mainly of barium titanate was mixed with an appropriate organic solvent and an appropriate resin to obtain a slurry. The slurry was formed into a ceramic dielectric material sheet having a predetermined thickness with a doctor blade. A Pd electrode paste was then printed on the sheet by screen printing to form a predetermined electrode pattern. The dielectric material sheet bearing no electrode pattern and the dielectric material sheet bearing the printed electrode pattern were laminated to a predetermined thickness in a predetermined number of laminated layers. The resulting assemblage was cut into a predetermined size (5.5 mm×4.0 mm). The resulting green chip was degreased (400° to 700° C., 30 minutes) and then sintered (1,200° to 1,300° C., 2 hours, in air) to obtain a sintered chip. Sides of the sintered chip were coated with silver through baking, and then plated with tin and a solder. Thus, the multilayer ceramic capacitor was produced.

EXAMPLE 2

A multilayer ceramic capacitor having the same structure as in Example 1 was produced, except that each interlayer had a thickness of 150 $\mu$m. This capacitor was produced by the same procedure as in Example 1.

EXAMPLE 3

A multilayer ceramic capacitor having the same structure as in Example 1 was produced, except that each interlayer had a thickness of 300 $\mu$m. This capacitor was produced by the same procedure as in Example 1.

EXAMPLE 4

Figure 3:
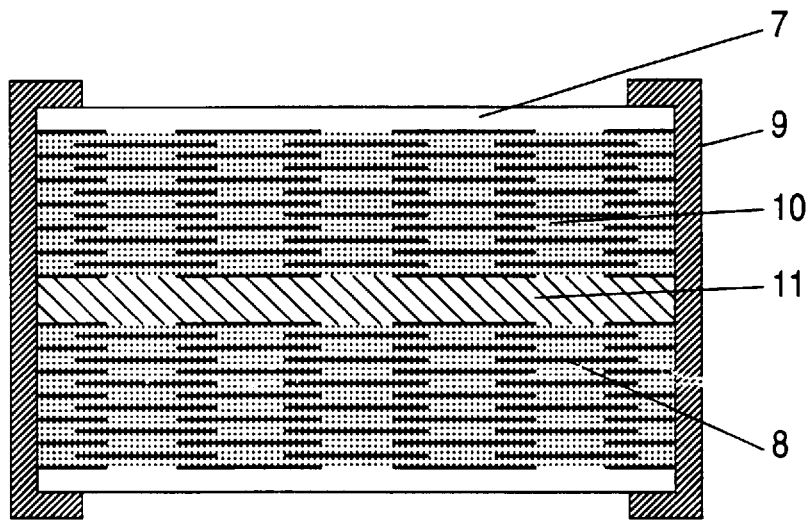
FIG. 3 shows a sectional view of a multilayer ceramic capacitor in Example 4 according to the present invention which has one layer incapable of forming a capacity.

A multilayer ceramic capacitor having a sectional view shown in FIG. 3 was produced. As shown in FIG. 3, the multilayer ceramic capacitor of Example 4 had a structure produced by stacking two units of capacity-forming layers, each of which was composed of twelve dielectric layers 10, together with an interlayer 11 having a thickness of 300 $\mu$m, forming insulating layers 7 as the outermost layers, and further forming outer electrodes 9 connected to internal electrodes 8, the electrodes having the same structure as in Example 1. This capacitor was produced by the same procedure as in Example 1.

EXAMPLE 5

A multilayer ceramic capacitor having the same structure as in Example 1 was produced, except that each interlayer had a thickness of 900 μm. This capacitor was produced by the same procedure as in Example 1.

EXAMPLE 6

A multilayer ceramic capacitor having the same structure as in Example 4 was produced, except that each block of capacity-forming dielectric layer was composed of eight dielectric layers. This capacitor was produced by the same procedure as in Example 1.

EXAMPLE 7

Figure 4:
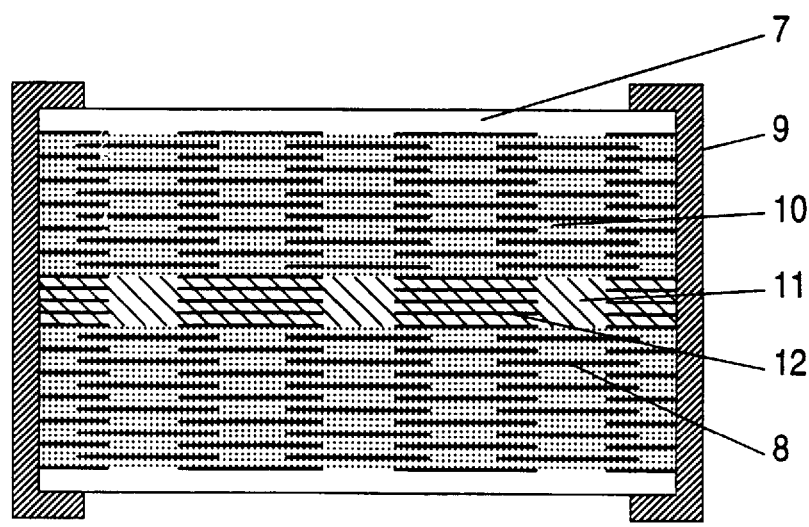
FIG. 4 shows a sectional view of a multilayer ceramic capacitor in Example 7 according to the present invention which has a layer incapable of forming a capacity and has, within that layer, electrode layers incapable of forming a capacity (dummy electrodes).

A multilayer ceramic capacitor having the same structure as in Example 6 was produced, except that the interlayer contained electrode layers 12 incapable of forming a capacity (dummy electrodes), as shown in FIG. 4. This capacitor was produced by the same procedure as in Example 1.

COMPARATIVE EXAMPLE 1

Figure 5:
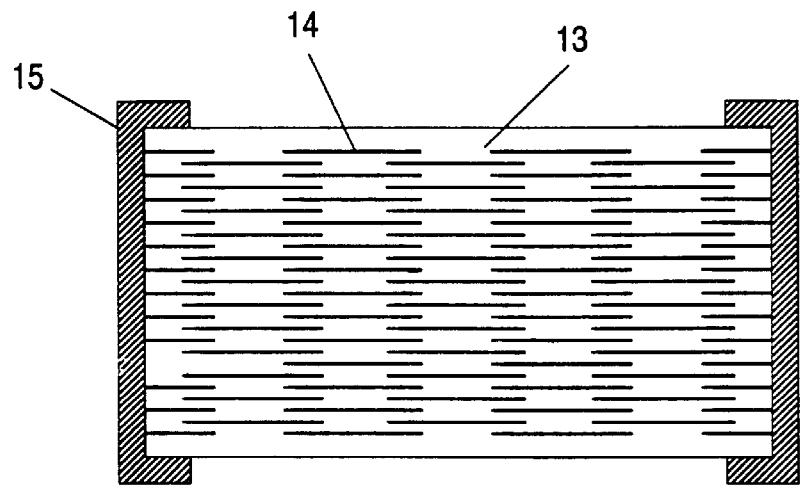
FIG. 5 shows a sectional view of a conventional multilayer ceramic capacitor in Comparative Example 1 having a large capacity and a high withstand voltage.

A conventional multilayer ceramic capacitor having a sectional view shown in FIG. 5 was produced. As shown in FIG. 5, the multilayer ceramic capacitor of Comparative Example 1 had a structure produced by laminating dielectric layers 13 consisting mainly of barium titanate alternately with Pd internal electrodes 14, and forming outer electrodes 15 made of silver connected to the internal electrodes 14, the internal electrodes being arranged to form capacity-forming parts arranged in series, thereby making the structure suitable for a high withstand voltage.

In the multilayer ceramic capacitor having the electrode structure described above, the number of capacity-forming dielectric layers was 24 and the thickness of each of these layers was 75 μm.

The capacitor was produced by the same procedure as in the Examples given above.

COMPARATIVE EXAMPLE 2

Figure 6:
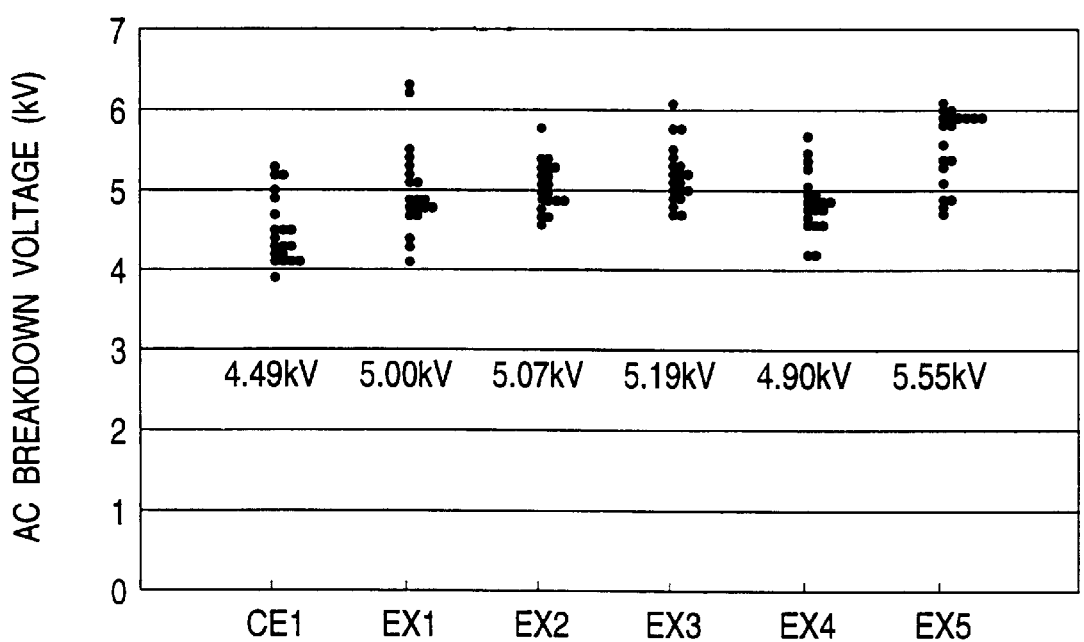
FIG. 6 shows a graph showing AC breakdown voltage levels for a Comparative Example and Examples.

A multilayer ceramic capacitor having the same structure as in Comparative Example 1 was produced, except that the number of capacity-forming dielectric layers was 16.
Evaluation:

The capacitors of Examples 1, 2, 3, 4, and 5 and Comparative Example 1 were examined for breakdown voltage. The results obtained are shown in FIG. 6. The numerical values in FIG. 6 are average values of breakdown voltage for each Examples or Comparative Example. In FIG. 6, "EX" indicates Example and "CE" indicates Comparative Example (hereinafter the same).

In the measurement of breakdown voltage, the applied voltage was increased at a rate of 1 kV/sec (AC 50 Hz), and the value of voltage at the time when the current had reached 10 mA was taken as a breakdown voltage.

The results show that all the capacitors of the Examples, which each had at least one interlayer, had higher levels of AC breakdown voltage than the capacitor of the Comparative Example.

The capacitors of Examples 1, 2, 3, 4, and 5 and Comparative Example 1 were examined for DC withstand voltage.

Figure 7:
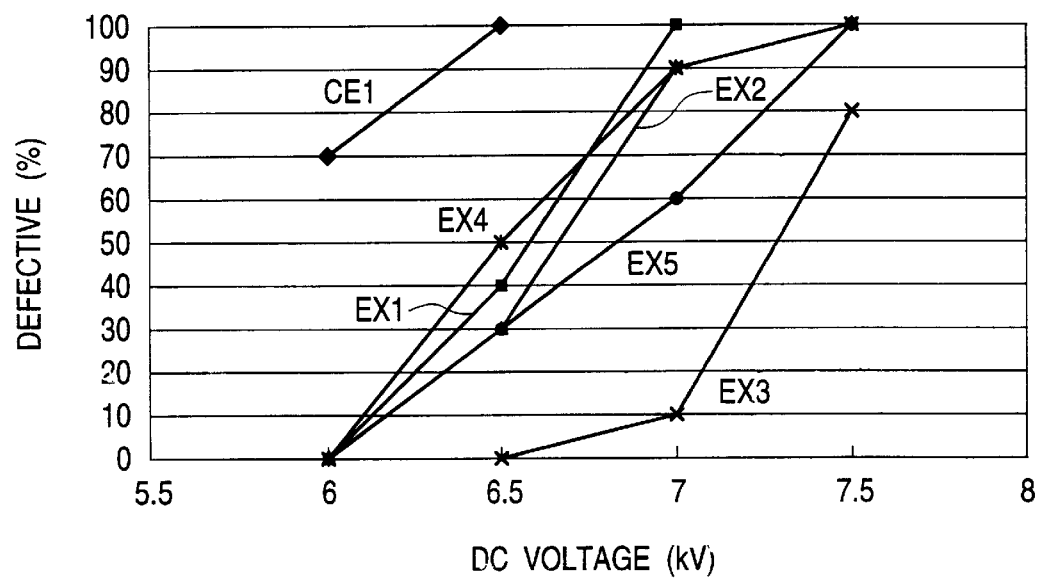
FIG. 7 shows a graph showing DC withstand voltage levels for a Comparative Example and Examples.

The results obtained are shown in FIG. 7.

In the withstand voltage measurement, a predetermined voltage (DC voltage) was applied for 5 seconds. Capacitors in which this voltage application resulted in a current of 1 mA or more were regarded as defective in withstand voltage.

It is generally considered that high-voltage type capacitors are required to have a withstand voltage of DC 6 kV or higher so as to withstand surge voltage, pulse voltage, etc. generated by appliances. A 6 kV DC withstand voltage test of the capacitor of Comparative Example 1 resulted in a defective of 70%, whereas application of the same voltage of 6 kV to the capacitor of Example 1, which had interlayers, resulted in no defective. The capacitor of Example 3, in which the interlayer thickness was four times that in Example 1, resulted in no defective even when a voltage of 6.5 kV was applied. The capacitor of Example 4, which had a smaller number of interlayers than in Example 3, had almost the same level of DC withstand voltage as in Example 1 though that level was lower than in Example 3. Further, the capacitor of Example 5, in which the interlayer thickness was three times that in Example 4, showed an improved level of DC withstand voltage.

The reason why the formation of an interlayer is effective in improving DC withstand voltage and AC breakdown voltage may be as follows.

In producing a multilayer ceramic capacitor, dielectric layers and internal electrodes are simultaneously formed through sintering. However, since the two materials show different behaviors in sintering, strains and defects remain inside. This phenomenon is known to become more pronounced as the number of dielectric layers increases, i.e., as the proportion of the internal electrodes to the dielectric material increases. Since the multilayer ceramic capacitors according to the present invention have one or more interlayers, the proportion of the internal electrodes to the dielectric material is relatively small, and this brings about a high DC withstand voltage and a high AC breakdown voltage.

Figure 8:
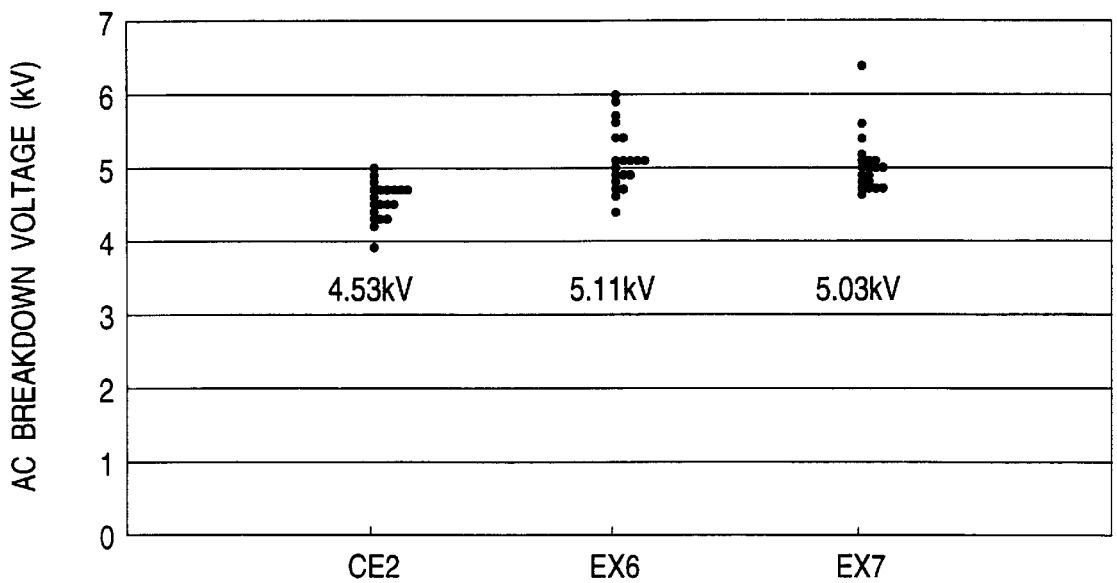
FIG. 8 shows a graph showing AC breakdown voltage levels for a Comparative Example and Examples.

For ascertaining the above, the capacitor of Example 7, which had an interlayer containing internal electrodes incapable of forming a capacity and thereby had an increased internal-electrode proportion, was examined for AC breakdown voltage together with the capacitor of Example 6, which had an interlayer containing no internal electrode, and the capacitor of Comparative Example 2. The results obtained are shown in FIG. 8. The numerical values in FIG. 8 are average values of breakdown voltage for each Examples or Comparative Example.

These results show that the presence or absence of those internal electrodes did not influence the value of AC breakdown voltage, that is, the difference in electrode proportion produced no influence. However, the capacitors of the Examples each had a higher AC breakdown voltage than the capacitor of Comparative Example 2.

It can be understood from the above results that the interlayer is effective not in mitigating the internal defects caused by a difference in sintering behavior between the dielectric material and the internal electrodes, but is effective in dissipating the expansion stress caused by the counter piezoelectric phenomenon of the capacity-forming layers. When a large number of capacity-forming layers are laminated continuously, the individual strains are accumulated to give a large stress. It is however considered that a reduction in the number of capacity-forming layers and the division of these layers are effective in diminishing the stress imposed on the margins and in preventing the generation of defects.

As demonstrated above, the multilayer ceramic capacitors according to the present invention, which have one or more interlayers, can have a large capacity which has been unrealized because of withstand voltage defective.

As described above in detail, a multilayer ceramic capacitor which has a large capacity, a high withstand voltage, and excellent reliability and is small, lightweight, and inexpensive can be provided by the present invention by forming a layer incapable of forming a capacity as an interlayer between capacity-forming layers.

While the invention has been described in detail and with reference to specific examples thereof, it will be apparent to one skilled in the art that various changes and modifications can be made therein without departing from the spirit and scope thereof.

What is claimed as new and desired to be secured by Letters Patent of the United States is:

1. A multilayer ceramic capacitor comprising:

a plurality of capacity-forming layers; and an interlayer resistant to counter piezoelectric expansion, said interlayer provided between said plurality of capacity-forming layers.

2. A multilayer ceramic capacitor as in claim 1, wherein each of said plurality of capacity-forming layers comprises seven or more internal electrode layers including a first electrode layer and a second electrode layer, said first electrode layer having two or more electrodes, said second electrode layer having two or more electrodes which all face said first electrode layer, said first and second electrode layers forming two or more capacitor units connected in series.

3. A multilayer ceramic capacitor as claimed in claim 1, wherein said interlayer has a thickness of from 75 to 900 μm.

4. A multilayer ceramic capacitor as claimed in claim 2, wherein said interlayer has a thickness of from 75 to 900 μm.

5. A multilayer ceramic capacitor comprising:

a plurality of capacity-forming layers; and an interlaver resistant to counter piezoelectric expansion, said interlaver provided between said plurality of capacity-forming layers, wherein said interlayer contains internal electrodes incapable of forming a capacity.

6. A multilayer ceramic capacitor comprising:

a plurality of capacity-forming layers, each of said capacity-forming layers comprising seven or more internal electrode layers including a first electrode layer and a second electrode layer, said first electrode layer having two or more electrodes, said second electrode layer having one or more electrodes which all face said first electrode layer, said first and second electrode lavers forming two or more capacitor units connected in series; and an interlayer resistant to counter piezoelectric expansion, said interlayer provided between said plurality of capacity-forming layers, wherein said interlayer contains internal electrodes having a structure incapable of forming a capacity.

7. A multilayer ceramic capacitor comprising:

a plurality of capacity-forming layers; and an interlayer resistant to counter piezoelectric expansion, said interlayer provided between said plurality of capacity-forming layers, said interlayer having a thickness of from 75 to 900 μm, wherein said interlayer contains internal electrodes having a structure incapable of forming a capacity.

8. A multilayer ceramic capacitor comprising:

a plurality of capacity-forming layers, each of said capacity-forming layers comprising seven or more internal electrode layers including a first electrode layer and a second electrode layer, said first electrode layer having two or more electrodes, said second electrode layer having one or more electrodes which all face said first electrode layer, said first and second electrode livers forming two or more capacitor units connected in series; and an interlayer resistant to counter piezoelectric expansion, said interlayer provided between said plurality of capacity-forming layers, said interlayer having a thickness of from 75 to 900 μm, wherein said interlayer contains internal electrodes having a structure incapable of forming a capacity.

* * * * *